(12) United States Patent
Bhatia et al.

(10) Patent No.: US 9,158,482 B2
(45) Date of Patent: Oct. 13, 2015

(54) RECOMMENDING AND INSTALLING SCHEDULED DELIVERY PRINT APPLICATIONS

(71) Applicant: HEWLETT-PACKARD DEVELOPMENT COMPANY, L.P., Houston, TX (US)

(72) Inventors: Rajesh Bhatia, Bangalore (IN); Sandeep Matti Prabhu, Bangalore (IN)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 40 days.

(21) Appl. No.: 13/872,158

(22) Filed: Apr. 29, 2013

(65) Prior Publication Data

US 2014/0320892 A1    Oct. 30, 2014

(51) Int. Cl.
  *G06K 15/00* (2006.01)
  *G06F 3/12* (2006.01)

(52) U.S. Cl.
  CPC ............ *G06F 3/1204* (2013.01); *G06F 3/1229* (2013.01); *G06F 3/1268* (2013.01); *G06F 3/1288* (2013.01); *G06F 2216/17* (2013.01)

(58) Field of Classification Search
  None
  See application file for complete search history.

(56) References Cited

U.S. PATENT DOCUMENTS

| | | | |
|---|---|---|---|
| 6,741,262 B1 | 5/2004 | Munson et al. | |
| 6,779,119 B1* | 8/2004 | Moshfeghi et al. | 726/23 |
| 6,826,534 B1* | 11/2004 | Gupta et al. | 705/7.12 |
| 6,967,728 B1 | 11/2005 | Vidyanand | |
| 6,972,861 B1* | 12/2005 | van Zee et al. | 358/1.15 |
| 7,038,796 B1* | 5/2006 | Gupta et al. | 358/1.15 |
| 7,065,497 B1* | 6/2006 | Brewster et al. | 705/14.61 |
| 7,136,177 B1* | 11/2006 | Bryan et al. | 358/1.15 |
| 7,136,178 B1* | 11/2006 | Gupta et al. | 358/1.15 |
| 7,149,783 B2* | 12/2006 | Frolik et al. | 709/207 |
| 8,543,907 B1 | 9/2013 | Roskind | 715/234 |
| 8,699,053 B2* | 4/2014 | Hoover et al. | 358/1.15 |
| 2001/0017707 A1* | 8/2001 | Lee | 358/1.12 |
| 2001/0043364 A1* | 11/2001 | Messner et al. | 358/1.15 |
| 2002/0049723 A1* | 4/2002 | Kurihara et al. | 707/1 |
| 2003/0045273 A1* | 3/2003 | Pyhalammi et al. | 455/412 |
| 2003/0081019 A1* | 5/2003 | Frolik et al. | 347/5 |
| 2003/0137690 A1* | 7/2003 | Hoover et al. | 358/1.15 |

(Continued)

FOREIGN PATENT DOCUMENTS

JP    2003241922 A    8/2003

OTHER PUBLICATIONS

"New Release of EFI PrintMe Mobile Eases Deployment and Simplifies Wireless Printing for Tablets and Smartphones", Rockport Custom Publishing, LLC © 2013, Feb. 27, 2012, 2 pages, Available at: <dpsmagazine.com/Content/ContentCT.asp?P=791&cmpyNm=EFI>.

(Continued)

*Primary Examiner* — Ted Barnes
(74) *Attorney, Agent, or Firm* — Mannava & Kang, P.C.

(57) ABSTRACT

A system and method for recommending and installing scheduled delivery (SD) print applications is disclosed. In one example, one or more SD print applications are determined based on prior usage of SD print applications in a printer application store by a user of a web connected computing device. Further, the determined one or more SD print applications are recommended by sending a notification to the web connected computing device and then to a web connected printer via an electronic messaging service.

15 Claims, 4 Drawing Sheets

(56) References Cited

U.S. PATENT DOCUMENTS

| | | | |
|---|---|---|---|
| 2003/0223089 A1* | 12/2003 | Laursen et al. | 358/1.15 |
| 2004/0045029 A1* | 3/2004 | Matsuura | 725/93 |
| 2005/0203917 A1* | 9/2005 | Freeberg et al. | 707/10 |
| 2007/0052994 A1 | 3/2007 | Gullett et al. | |
| 2007/0162778 A1* | 7/2007 | Dutton et al. | 713/323 |
| 2007/0253010 A1 | 11/2007 | Selvaraj | |
| 2007/0294356 A1* | 12/2007 | Shimooka | 709/206 |
| 2008/0066125 A1* | 3/2008 | Li et al. | 725/97 |
| 2008/0137136 A1 | 6/2008 | Shin | |
| 2008/0172274 A1* | 7/2008 | Hurowitz et al. | 705/8 |
| 2008/0295128 A1* | 11/2008 | Aaltonen | 725/32 |
| 2009/0051962 A1 | 2/2009 | Asai et al. | |
| 2009/0276771 A1 | 11/2009 | Nickolov et al. | |
| 2010/0082659 A1* | 4/2010 | Reddy et al. | 707/767 |
| 2010/0118341 A1* | 5/2010 | Ozawa et al. | 358/1.15 |
| 2010/0128301 A1* | 5/2010 | Bisset | 358/1.15 |
| 2010/0333137 A1* | 12/2010 | Hamano et al. | 725/39 |
| 2011/0072035 A1* | 3/2011 | Gaucas et al. | 707/769 |
| 2011/0090535 A1* | 4/2011 | Towata | 358/1.15 |
| 2011/0173225 A1* | 7/2011 | Stahl et al. | 707/769 |
| 2012/0116559 A1 | 5/2012 | Davis et al. | |
| 2012/0140265 A1* | 6/2012 | Laursen et al. | 358/1.15 |
| 2012/0194851 A1 | 8/2012 | Srinivasmurthy et al. | |
| 2012/0271960 A1* | 10/2012 | Geetha et al. | 709/229 |
| 2013/0003106 A1* | 1/2013 | Nishida et al. | 358/1.14 |
| 2013/0185148 A1* | 7/2013 | Townsend | 705/14.49 |
| 2013/0286416 A1* | 10/2013 | Saurabh | 358/1.13 |
| 2013/0290104 A1* | 10/2013 | Hurowitz et al. | 705/14.58 |
| 2014/0029028 A1* | 1/2014 | Fallon et al. | 358/1.9 |
| 2014/0035823 A1* | 2/2014 | Khoe et al. | 345/171 |
| 2014/0040760 A1* | 2/2014 | Randell et al. | 715/745 |
| 2014/0082558 A1* | 3/2014 | Lynch | 715/835 |
| 2014/0082659 A1* | 3/2014 | Fife et al. | 725/32 |
| 2014/0164586 A1* | 6/2014 | Dankberg et al. | 709/223 |
| 2014/0372429 A1* | 12/2014 | Ziklik et al. | 707/736 |

OTHER PUBLICATIONS

Datatracker, "Internet Printing Protocol (ipp)," (Web Page), Dec. 7, 2010, 2 pages, available at http://datatracker.ietf.org/wg/ipp/charter/.

Harish, et al., "Cloud Printer With a Common User Print Experience," PCT Application Serial No. PCT/US2010/021442 filed Jan. 20, 2010, 32 pages.

Harish, et al., "Printer Installation At a Cloud Server," U.S. Appl. No. 12/689,254, filed Jan. 19, 2010, 25 pages.

Harish, et al., "Web Printing," U.S. Appl. No. 12/544,223, filed Aug. 20, 2009, 28 pages.

Joseph, Joshy; "Patterns for High Availability, Scalability, and Computing Power with Windows Azure"; May 2009; 10 pages.

* cited by examiner

RECOMMENDING AND INSTALLING SCHEDULED DELIVERY PRINT APPLICATIONS

BACKGROUND

Typically, a printer application store includes a variety of scheduled delivery (SD) print applications related to various categories, such as sports, news, horoscopes and the like. To install a SD print application, a user may have to login to the printer application store using login credentials, such as a username and password, via a web connected computing device, such as a personal computer (PC), a tablet, a mobile device and the like. After logging in, one or more keywords describing a category of SD print application is entered. Based on the keywords entered, the printer application store lists out various SD print applications. Then, one or more SD print applications of interest can be selected from the list using the web connected computing device and installed for a web connected printer.

However, the number of SD print applications available in a printer application store, in each category, can be enormous. The sheer quantity of the SD print applications available can make it difficult and time consuming to find relevant and interesting SD print applications. This may detract from the overall user experience.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for recommending and installing scheduled delivery (SD) print applications is disclosed. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

The term "recommended SD print application" refers to a SD print application that a user can install on a SD print service and schedule for printing on a web connected printer based on its functionality. For example, categories of the SD print applications include news, magazines, current affairs, sports, horoscopes and the like. The term "resident SD print application" refers to a SD print application that a user has already installed on the SD print service and scheduled for printing on the web connected printer based on its functionality. The term "printer application store" refers to a web based software application store for delivering SD print applications. Further, the printer application store allows to browse, select and install SD print applications, using a web connected computing device, such as a personal computer (PC), mobile phone, tablet and the like, for use with the web connected printer.

Figure 1:
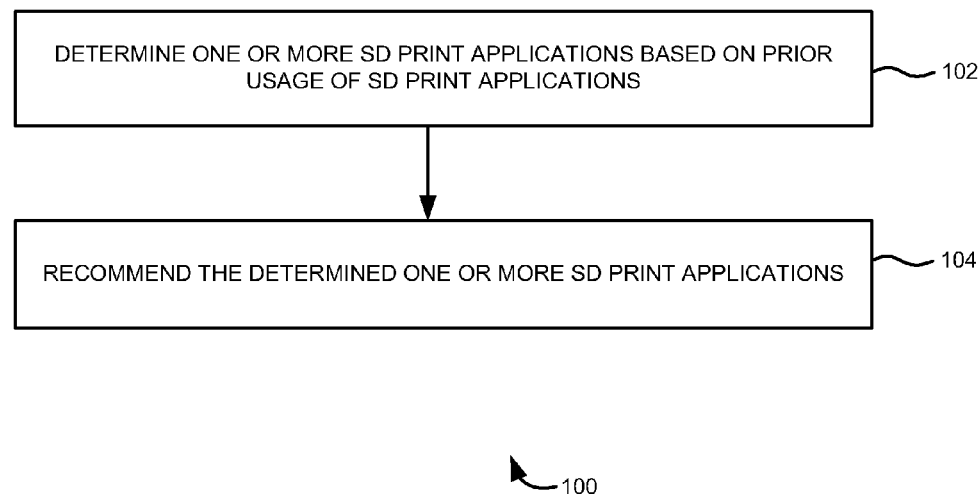
FIG. 1 illustrates an exemplary flow diagram of a method for recommending and installing scheduled delivery (SD) print applications.

FIG. 1 illustrates an exemplary flow diagram 100 of a method for recommending and installing SD print applications. At block 102, one or more SD print applications are determined based on prior usage of SD print applications in a printer application store by a user of a web connected computing device. In context, the one or more SD print applications are determined based on prior usage of resident SD print applications in the printer application store, residing in a SD print service, by the user of the web connected computing device. For example, a resident SD print application is a SD print application that a user has already installed on the SD print service and scheduled for printing on a web connected printer based on its functionality. This is explained in more detail with reference to FIGS. 2A-2B. In one example, the prior usage of the SD print applications in the printer application store by the user is monitored. In one scenario, categories of SD print applications which are browsed by the user and/or SD print applications which are already installed by the user are monitored. In another scenario, when the user launches a SD print application, the SD print application is monitored for frequency of launching the SD print application, time the SD print application remained open, and the like.

At block 104, the determined SD print applications are recommended for installation by sending a notification to the web connected computing device and then to the web connected printer via an electronic messaging service. This is explained in more detail with reference to FIGS. 2A, 2B and 3. For example, the notification includes a uniform resource locator (URL) for each of the recommended SD print applications. Exemplary electronic messaging service includes an email messaging service, a short message service (SMS) and a pop-up message service. Exemplary web connected computing device includes a PC, a mobile phone and a tablet.

Further, the recommended SD print applications are installed based on user's selection. For example, the recommended SD print applications are SD print applications that a user can install on the SD print service and schedule for printing on the web connected printer based on its functionality. In one example implementation, one or more of the recommended SD print applications are selected. Further in this example implementation, it is determined whether the user is connected to the printer application store. If it is determined that the user is connected to the printer application store, then existing authentication information of the user is used by the printer application store and the selected one or more SD print applications are installed. If it is determined that the user is not connected to the printer application store, then authentication information of the user is obtained and the selected one or more SD print applications are installed. This is explained in more detail with reference to FIGS. 2A-2B. Furthermore, the installed SD print applications are configured based on user preferences. In addition, the installed SD print applications generate and print content using the web connected printer. This is explained in more detail with reference to FIGS. 2A-2B.

Figure 2A:
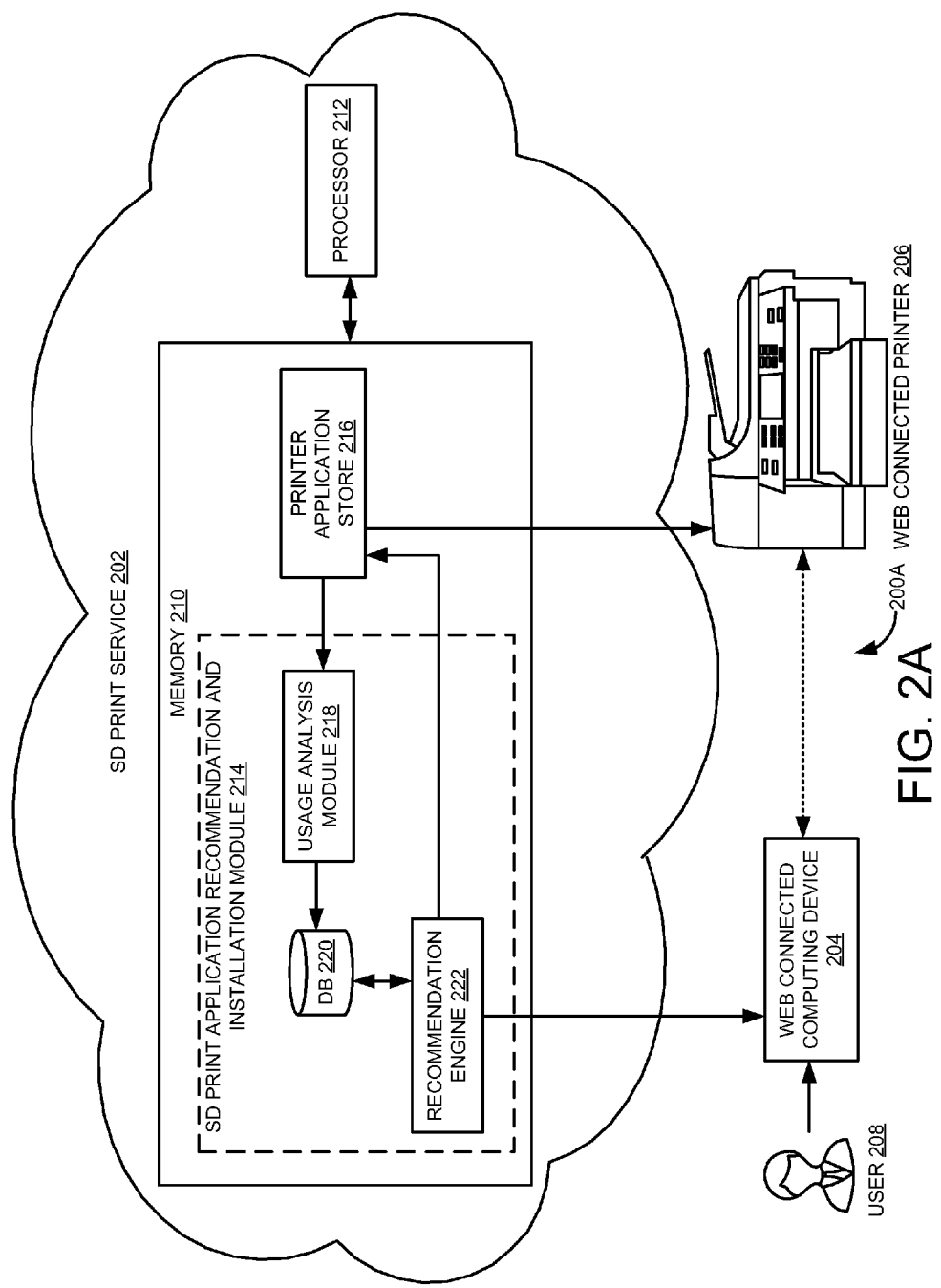
FIG. 2A illustrates an exemplary schematic of a system for recommending and installing SD print applications.

Referring now to FIG. 2A, which illustrates an exemplary schematic 200A of a system for recommending and installing SD print applications. As shown in FIG. 2A, the schematic 200A includes a user 208 of a web connected computing device 204, a web connected printer 206 and a SD print service 202. Exemplary web connected computing device includes a PC, a mobile phone and a tablet. Further as shown in FIG. 2A, the SD print service 202 includes memory 210 and a processor 212. Furthermore as shown in FIG. 2A, the memory 210 includes a SD print application recommendation and installation module 214 and a printer application store 216. In addition as shown in FIG. 2A, the SD print application recommendation and installation module 214 includes a recommendation engine 222, a database (DB) 220, and a usage analysis module 218.

Also as shown in FIG. 2A, the SD print service 202 is coupled to the web connected computing device 204 and the web connected printer 206. Moreover as shown in FIG. 2A, the web connected computing device 204 is coupled to the web connected printer 206 via a network, such as Internet. Further as shown in FIG. 2A, the usage analysis module 218 is coupled to the printer application store 216 and the database 220. Furthermore, the recommendation engine 222 is coupled to the database 220, the printer application store 216 and the web connected computing device 204.

In operation, the printer application store 216 monitors and sends the user's 208 usage patterns of SD print applications to the usage analysis module 218. In one example, the printer application store 216 monitors the user's 208 usage patterns of resident SD print applications. In this example, the resident SD print applications are SD print applications that the user 208 has already installed on the SD print service 202 and scheduled for printing on the web connected printer 206. In one exemplary implementation, the printer application store 216 monitors the user's 208 usage patterns of the SD print applications and stores the monitored information in the printer application store 216. The monitored information includes information, such as categories of SD print applications browsed by the user 208, SD print applications installed by the user 208 and the like. Exemplary categories of SD print applications include sports, news, horoscopes and the like.

Further in operation, the usage analysis module 218 analyses the user's 208 usage patterns of the SD print applications. In one example, the usage analysis module 218 analyses the user's 208 usage patterns of the SD print applications using predefined keywords. For example, if a user is using a sport based SD print application, then the usage analysis module 218 analyses the sport based SD print application based on predefined keywords, such as a name of the sport and the like. The usage analysis module 218 then determines one or more SD print applications based on the analyzed information. In one example, the determined SD print applications are SD print applications which are similar to the SD print applications browsed or already installed by the user 208. For example, if a user is using a tennis sport based SD print application, then the usage analysis module 218 determines one or more tennis sport based SD print applications in the sports category. The determined one or more SD print applications are then stored in the database 220.

Furthermore in operation, the recommendation engine 222 recommends the determined SD print applications for installation by sending a notification to the web connected computing device 204 and then to the web connected printer 206 via an electronic messaging service. For example, the notification includes an URL for each of the recommended SD print applications. Exemplary web connected computing device includes a PC, a mobile phone, a tablet and the like. In one exemplary implementation, the recommendation engine 222 obtains the determined SD print applications from the database 220. Further, the recommendation engine 222 sends the obtained SD print applications for installation by sending the notification to the web connected computing device 204. This is explained in more detail with reference to FIG. 2B.

Furthermore, the user 208 of the web connected computing device 204 selects one or more of the recommended SD print applications. For example, the user selects one or more of the recommended SD print applications by clicking the associated URL in the notification. The URL is a web address to install the associated SD print application. Also, if the user 208 is connected to the printer application store 216, then the printer application store 216 uses existing authentication information of the user 208 and installs the selected one or more SD print applications. If the user 208 is not connected to the printer application store 216, then the printer application store 216 obtains authentication information of the user 208 and installs the selected one or more SD print applications. Upon installing the selected one or more SD print applications, the printer application store 216 configures the installed SD print applications based on user preferences. For example, the user 208 may prefer to schedule time, day and frequency of obtaining printouts from the installed one or more SD print applications. This is explained in more detail with reference to FIG. 2B.

Figure 2B:
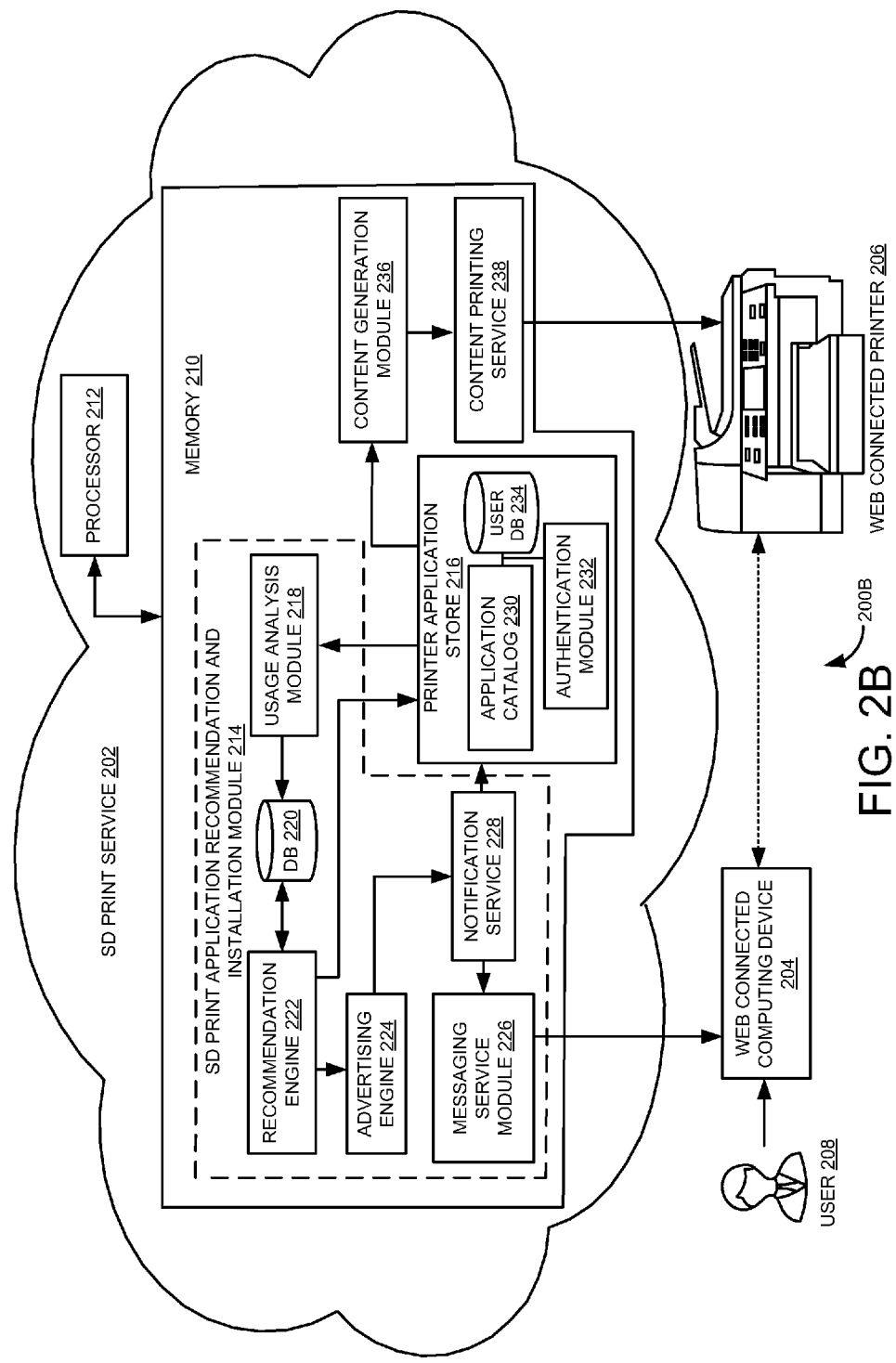
FIG. 2B illustrates another exemplary schematic of a system for recommending and installing SD print applications.

Referring now to FIG. 2B, which illustrates another exemplary schematic 200B of a system for recommending and installing SD print applications. As shown in FIG. 2B, the schematic 200B includes the user 208 of the web connected computing device 204, the web connected printer 206 and the SD print service 202. Exemplary web connected computing device includes a PC, a mobile phone and a tablet. Further as shown in FIG. 2B, the SD print service 202 includes the memory 210 and the processor 212. Furthermore as shown in FIG. 2B, the memory 210 includes the SD print application recommendation and installation module 214, the printer application store 216, a content generation module 236 and a content printing service 238.

In addition as shown in FIG. 2B, the SD print application recommendation and installation module 214 includes the recommendation engine 222, the database 220, the usage analysis module 218, an advertising engine 224, a messaging service module 226 and a notification service 228. Moreover as shown in FIG. 2B, the printer application store 216 includes an application catalog 230, a user database 234 and an authentication module 232.

Also as shown in FIG. 2B, the SD print service 202 is coupled to the web connected computing device 204 and the web connected printer 206. Moreover as shown in FIG. 2B, the web connected computing device 204 is coupled to the web connected printer 206 via a network, such as Internet.

Further as shown in FIG. 2B, the usage analysis module 218 is coupled to the printer application store 216 and the database 220. Furthermore, the recommendation engine 222 is coupled to the database 220, the advertising engine 224 and the printer application store 216. In addition, the advertising engine 224 is coupled to the notification service 228. Also, the notification service 228 is coupled to the messaging service module 226 and the printer application store 216. Moreover, the messaging service module 226 is coupled to the web connected computing device 204.

Furthermore as shown in FIG. 2B, the content generation module 236 is coupled between the printer application store 216 and the content printing service 238. In addition, the content printing service 238 is coupled to the web connected printer 206. Also, the application catalog 230, the user database 234 and the authentication module 232 are coupled to each other. For example, the application catalog 230 includes various SD print applications.

In operation, the printer application store 216 monitors the prior usage of SD print applications by the user 208. In one exemplary implementation, the printer application store 216 monitors the prior usage of the SD print applications by the user 208 in the application catalog 230 and stores the monitored information in a user profile in the user database 234. The monitored information includes information, such as categories of SD print applications browsed by the user 208, SD print applications installed by the user 208 and the like. Exemplary categories of SD print applications include sports, news, horoscopes and the like.

Further in operation, the usage analysis module 218 analyses the monitored usage of SD print applications stored in the user profile in the user database 234. In one example, if a user is using a sport based SD print application, then the usage analysis module 218 analyses the sport based SD print application based on predefined keywords, such as a name of the sport and the like. The usage analysis module 218 then determines the one or more SD print applications based on the analyzed information. In one example, the determined SD print applications are SD print applications which are similar to the SD print applications browsed or already installed by the user 208. For example, if a user is using a badminton sport based SD print application, then the usage analysis module 218 determines one or more badminton sport based SD print applications in the sports category. The determined one or more SD print applications are then stored in the database 220.

Furthermore in operation, the recommendation engine 222 recommends the determined one or more SD print applications for installation by sending the notification to the web connected computing device 204 and then to the web connected printer 206 via an electronic messaging service. Exemplary web connected computing device includes a PC, a mobile phone and a tablet. In one exemplary implementation, the recommendation engine 222 obtains the determined one or more SD print applications from the database 220. Further, the recommendation engine 222 sends the obtained one or more SD print applications to the notification service 228 via the advertising engine 224. The advertising engine 224 may attach advertisements along with the obtained one or more SD print applications. For example, if the obtained one or more SD print applications are related to sports, then the advertising engine 224 includes advertisements related to sports.

In addition in operation, the notification service 228 sends the obtained one or more SD print applications along with the advertisements to the web connected computing device 204 via the messaging service module 226. In one exemplary implementation, the messaging service module 226 sends the obtained one or more SD print applications in the form of the notification via the electronic messaging service. Exemplary electronic messaging service includes an email messaging service, a SMS and a pop-up message service. Further, the notification includes an URL for each of the recommended one or more SD print applications.

Moreover in operation, the user 208 of the web connected computing device 204 selects one or more of the recommended SD print applications. For example, the user selects one or more of the recommended SD print applications by clicking the associated URL in the notification. The URL is a web address to install the associated SD print application from the application catalog 230.

Upon selecting one or more of the recommended SD print applications, the authentication module 232 determines whether the user is connected to the printer application store 216. If the authentication module 232 determines that the user 208 is connected to the printer application store 216, then the authentication module 232 uses existing authentication information of the user 208 and installs the selected one or more SD print applications. If the authentication module 232 determines that the user 208 is not connected to the printer application store 216, then the authentication module 232 obtains authentication information of the user 208 and installs the selected one or more SD print applications. For example, the authentication module 232 presents the user 208 with a login screen on the web connected computing device 204 to obtain the authentication information. Furthermore, the application catalog 230 includes the installed one or more SD print applications in the user profile in the user database 234.

Upon installing the selected one or more SD print applications, the printer application store 216 configures the installed SD print applications based on user preferences. For example, the user may prefer to schedule time, day and frequency of obtaining printouts from the installed one or more SD print applications. Based on the configuration of the installed SD print applications, the content generation module 236 and the content printing service 238 generate and print content using the web connected printer 206.

Figure 3:
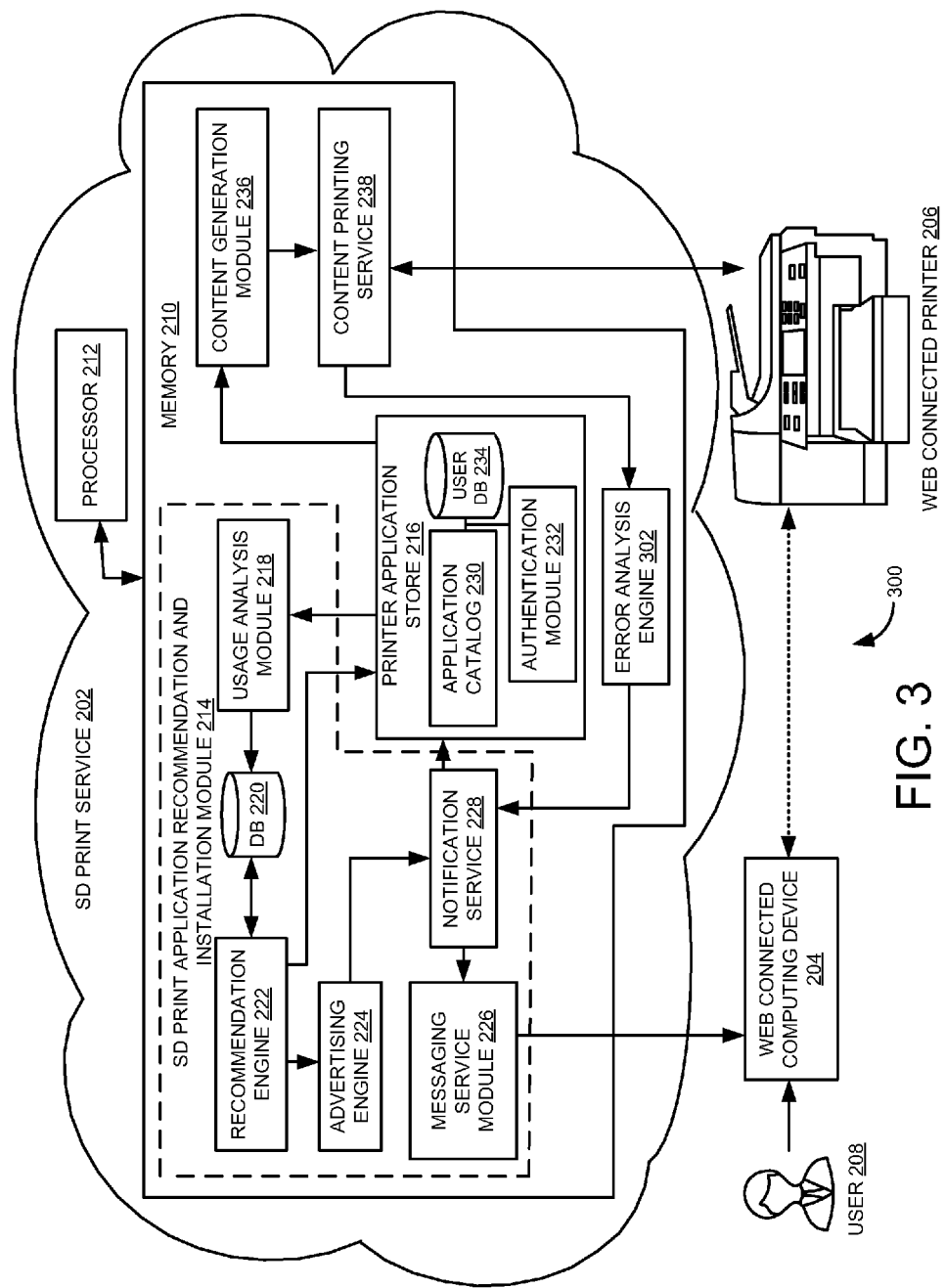
FIG. 3 illustrates an exemplary schematic of a system for recommending SD print applications in a notification for SD print errors.

Referring now to FIG. 3, which illustrates an exemplary schematic 300 of a system for recommending SD print applications in a notification for SD print errors. The schematic 300 shown in FIG. 3 is similar to the schematic 200 shown in FIG. 2B, except FIG. 3 shows using an error analysis engine 302. As shown, the error analysis engine 302 is coupled between the content printing service 238 and the notification service 228.

In operation, based on the configuration of the installed SD print applications, the content generation module 236 generates content to be printed by the web connected printer 206. Further, the content printing service 238 sends the generated content to the web connected printer 206 for printing. In some scenarios, if the web connected printer 206 is unable to print the content due to an error condition, the web connected printer 206 sends a SD print error notification to the error analysis engine 302 via the content printing service 238. Exemplary error condition includes the web connected printer 206 being jammed, the web connected printer 206 may not have paper to print the content and the like.

Further in operation, the error analysis module 302 analyses the SD print error notification to determine the error condition. Furthermore, the error analysis module 302 sends the determined error condition to the notification service 228. The notification service 228 then sends the error condition to the web connected computing device 204 along with one or more SD print applications for recommendation via the messaging service module 226. The error condition is included in a notification including the recommended one or more SD print applications. The details regarding receiving the recommended one or more SD print applications by the notification service 228 is explained in detail with reference to FIG. 2B.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In various examples, system and method described in FIGS. 1 through 3 enable recommending one or more SD print applications to users by sending a notification via an electronic messaging service. Further, the system and method enable one click installation of the recommended SD print applications by selecting an URL associated with the SD print application in the notification. Furthermore, the SD print applications are recommended based on user's prior usage of SD print applications in the printer application store.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
   determining, by a processor of a server, scheduled delivery (SD) print applications for recommendation to a user of a computing device based on prior usage of SD print applications by the user and based on categories of the SD print applications;
   sending a notification of the recommended SD print applications to the computing device and then to a printer;
   installing, by the processor, one of the recommended SD print applications in response to a user selection received from the computing device; and
   configuring, by the processor, the installed SD print application based on a user preference of a scheduled time for delivery of content to the printer.

2. The method of claim 1, wherein the notification of the recommended SD print applications comprises a respective uniform resource location (URL) for each of the recommended SD print applications, and
   wherein installing one of the recommended SD print applications is based on the user selection of one of the respective URLs for the recommended SD print application in the notification.

3. The method of claim 1, wherein installing one of the recommended SD print applications based on the user selection comprises:
   receiving the selection of one of the recommended SD print applications;
   determining whether the computing device of the user is connected to the server;
   in response to a determination that the computing device is connected to the server, using existing authentication information of the user and installing the selected SD print application; and
   in response to a determination that the computing device is not connected to the server, obtaining authentication information from the user and installing the selected SD print application.

4. The method of claim 1, further comprising:
   monitoring, by the processor, the prior usage of the SD print applications in a printer application store by the user.

5. The method of claim 1, sending the notification includes sending the notification via an electronic messaging service, wherein the electronic messaging service is selected from the group consisting of an email messaging service, a short message service (SMS) and a pop-up message service.

6. The method of claim 1, wherein the notification comprises a uniform resource locator (URL) for each of the recommended SD print applications.

7. The method of claim 1, wherein the computing device is selected from a group consisting of a personal computer (PC), a mobile phone and a tablet.

8. A scheduled delivery (SD) print service communicatively coupled to a web connected computing device and a web connected printer, wherein the SD print service comprises:
   a processor; and
   memory storing machine readable instructions to cause the processor to:
      determine SD print applications for recommendation to a user of the computing device based on prior usage of SD print applications by the user and based on categories of the SD print applications;
      send a notification of the recommended SD print applications to the computing device and then to the printer;
      install one of the recommended SD print applications based on a user selection received from the computing device; and
      configure the installed SD print application based on a user preference of a scheduled time for delivery of content to the printer.

9. The SD print service of claim 8, wherein the notification of the recommended SD print applications comprises a respective uniform resource location (URL) for each of the recommended SD print applications, and
   wherein the processor is to install one of the recommended SD print applications based on the user selection of the URL for the recommended SD print application in the notification.

10. The SD print service of claim 8, wherein, to install one of the recommended SD print applications based on the user selection, the processor is to:
    receive a selected SD print application;
    determine whether the computing device of the user is connected to the SD print service;
    in response to a determination that the computing device of the user is connected to the SD print service, use existing authentication information of the user and install the selected SD print application; and
    in response to a determination that the computing device of the user is not connected to the SD print service, obtain authentication information from the user and install the selected SD print application.

11. A non-transitory computer-readable storage medium storing machine readable instructions that, when executed by a computing device, cause the computing device to:
    determine SD print applications for recommendation to a user of a computing device based on prior usage of SD print applications in a printer application store by the user and based on categories of the SD print applications;
    send a notification of the recommended SD print applications to the computing device and then to a printer;
    install one of the recommended SD print applications based on a user selection received from the computing device; and
    configure the installed SD print application based on a user preference of a scheduled time for delivery of content to the printer.

12. The non-transitory computer-readable storage medium of claim 11, wherein the notification of the recommended SD print applications comprises a respective uniform resource location (URL) for each of the recommended SD print applications, and wherein the processor is to install one of the recommended SD print applications based on the user selection of the URL for the recommended SD print application in the notification.

13. The non-transitory computer-readable storage medium of claim 11, wherein, to install one of the recommended SD print applications based on the user selection, the processor is to:
   receive a selection of one or more of the recommended SD print applications;
   determine whether the computing device of the user is connected to the printer application store;
   in response to a determination that the computing device of the user is connected to the printer application store, use existing authentication information of the user by the printer application store and install the selected SD print application; and
   in response to a determination that the computing device of the user is not connected to the printer application store, obtain authentication information from the user and install the selected SD print application.

14. The non-transitory computer-readable storage medium of claim 11, the machine readable instructions further cause the processor to:
   monitor the prior usage of the SD print applications in the printer application store by the user.

15. The non-transitory computer-readable storage medium of claim 11, wherein the computing device is selected from a group consisting of a personal computer (PC), a mobile phone and a tablet.

* * * * *